(12) United States Patent
Takada et al.

(10) Patent No.: US 12,247,510 B2
(45) Date of Patent: Mar. 11, 2025

(54) ELECTRICALLY HEATING SUPPORT AND EXHAUST GAS PURIFICATION DEVICE

(71) Applicants: NGK Insulators, Ltd., Nagoya (JP); Toyota Jidosha Kabushiki Kaisha, Toyota (JP)

(72) Inventors: Takashi Takada, Nagoya (JP); Shinobu Shimasaki, Toyota (JP)

(73) Assignees: NGK INSULATORS, LTD., Nagoya (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/168,783

(22) Filed: Feb. 14, 2023

(65) Prior Publication Data

US 2023/0279799 A1    Sep. 7, 2023

(30) Foreign Application Priority Data

Mar. 2, 2022  (JP) ................. 2022-032107

(51) Int. Cl.
*F01N 3/28* (2006.01)
*F01N 3/027* (2006.01)
*F01N 3/20* (2006.01)

(52) U.S. Cl.
CPC ......... *F01N 3/2842* (2013.01); *F01N 3/2026* (2013.01); *F01N 3/027* (2013.01);
(Continued)

(58) Field of Classification Search
CPC ...... F01N 3/2842; F01N 3/2026; F01N 3/027; F01N 2240/16; F01N 2330/06;
(Continued)

(56) References Cited

U.S. PATENT DOCUMENTS 10,590,820 B2 * 3/2020 Takase ............... F01N 3/2875
11,283,138 B2 * 3/2022 Devos ............... H01M 50/502
(Continued)

FOREIGN PATENT DOCUMENTS

JP    2016030238 A  *  3/2016
JP    5910620 B2       4/2016

OTHER PUBLICATIONS

JP-2016030238-A (cited above) translation (Year: 2016).*
MSE Supplies, "Rhodium plated counter electrode model 4—metal mesh," archived as early as Sep. 27, 2020 (Year: 2020).*

*Primary Examiner* — Audrey B. Walter
(74) *Attorney, Agent, or Firm* — BURR PATENT LAW, PLLC (57) ABSTRACT

An electrically heating support according to the present invention includes: a ceramic honeycomb structure, the honeycomb structure including an outer peripheral wall and a partition wall arranged on an inner side of the outer peripheral wall, the partition wall defining a plurality of cells each extending from one end face to other end face to form a flow path; and a pair of metal electrodes 5 for applying a voltage to a honeycomb structure, wherein each of the pair of metal electrodes 5 includes: at least one connection portion 50 fixed to an outer peripheral surface of the honeycomb structure; and at least one drawer portion 51 extending from the connection portion 50, and wherein the drawer portion is provided with at least two bent portions 510, and extending directions of ridgelines of the at least two bent portions 510 are different from each other.

5 Claims, 8 Drawing Sheets

(52) U.S. Cl.
CPC ...... *F01N 2240/16* (2013.01); *F01N 2330/06* (2013.01); *F01N 2350/02* (2013.01)

(58) Field of Classification Search
CPC .... F01N 2350/02; F01N 3/2013; F01N 3/202; F01N 3/2839; F01N 3/2875; F01N 2550/22
See application file for complete search history.

(56) References Cited

U.S. PATENT DOCUMENTS

| | | | | |
|---|---|---|---|---|
| 2013/0017436 | A1* | 1/2013 | Kume | H01M 50/503 |
| | | | | 429/158 |
| 2015/0292386 | A1* | 10/2015 | Nishigaya | F01N 3/2026 |
| | | | | 60/320 |
| 2015/0380713 | A1* | 12/2015 | Kimura | H01H 37/32 |
| | | | | 429/121 |
| 2016/0032807 | A1* | 2/2016 | Sugiyama | F01N 3/2828 |
| | | | | 422/174 |
| 2016/0271561 | A1 | 9/2016 | Nakayama | |

* cited by examiner

ELECTRICALLY HEATING SUPPORT AND EXHAUST GAS PURIFICATION DEVICE

FIELD OF THE INVENTION

The present invention relates to an electrically heating support and an exhaust gas purification device.

BACKGROUND OF THE INVENTION

In recent years, an electrically heating catalyst (EHC) has been proposed in order to improve deterioration of exhaust gas purification performance immediately after engine start-up. The EHC is, for example, a pillar shaped honeycomb structure made of conductive ceramics, which is connected to metal electrodes and energized to generate heat in the honeycomb structure itself, thereby enabling it to increase a temperature to an activation temperature of a catalyst before engine start-up.

As an electrode for an electrically heating support, Patent Literature 1 discloses the use of an electrode including a drawer portion having a bellows-shaped bent structure.

CITATION LIST

Patent Literature

[Patent Literature 1] Japanese Patent No. 5910620 B

SUMMARY OF THE INVENTION

The bellows-shaped bent structure as described in Patent Literature 1 is formed by bending a metal sheet forming the drawer portion multiple times along a bending line extending in a direction parallel to an axial direction of the support. As a result of studies, the present inventors have revealed that although such a bent structure has good stress buffering against vibrations in a normal direction of an outer peripheral surface of an electrically heating support (a direction in which the drawer portion is contracted when the electrically heating support is inserted into a can body) and in a circumferential direction of the electrically heating support, it is weak against the vibration in the axial direction of the electrically heating support. Therefore, the electrodes may be damaged when subjected to the vibration in the axial direction, and there is room for improvement.

The present invention has been made to solve the above problems. An object of the present invention is to provide an electrically heating support and an exhaust gas purification device, which can improve resistance of metal electrodes to vibration.

The electrically heating support according to the present invention comprises: a ceramic honeycomb structure, the honeycomb structure comprising an outer peripheral wall and a partition wall arranged on an inner side of the outer peripheral wall, the partition wall defining a plurality of cells each extending from one end face to other end face to form a flow path; and a pair of metal electrodes for applying a voltage to a honeycomb structure, wherein each of the pair of metal electrodes comprises: at least one connection portion fixed to an outer peripheral surface of the honeycomb structure; and at least one drawer portion extending from the connection portion, and wherein the drawer portion is provided with at least two bent portions, and extending directions of ridgelines of the at least two bent portions are different from each other.

An exhaust gas purification device according to the present invention comprises: the electrically heating support as described above; and a metal can body housing the electrically heating support, the can body having an opening for drawing the drawer portion to the outside.

According to the electrically heating support and the exhaust gas purification device of the present invention, the drawer portion is provided with at least two bent portions, and the extending directions of the ridgelines of the at least two bent portions are different from each other, so that the resistance of the metal electrodes to vibration can be improved.

DETAILED DESCRIPTION OF THE INVENTION

The present invention is not limited to each embodiment, and components can be modified and embodied without departing from the spirit of the present invention. Further, various inventions can be formed by appropriately combining a plurality of components disclosed in each embodiment. For example, some components may be removed from all of the components shown in the embodiments. Furthermore, the components of different embodiments may be optionally combined.

Embodiment 1

Figure 1:
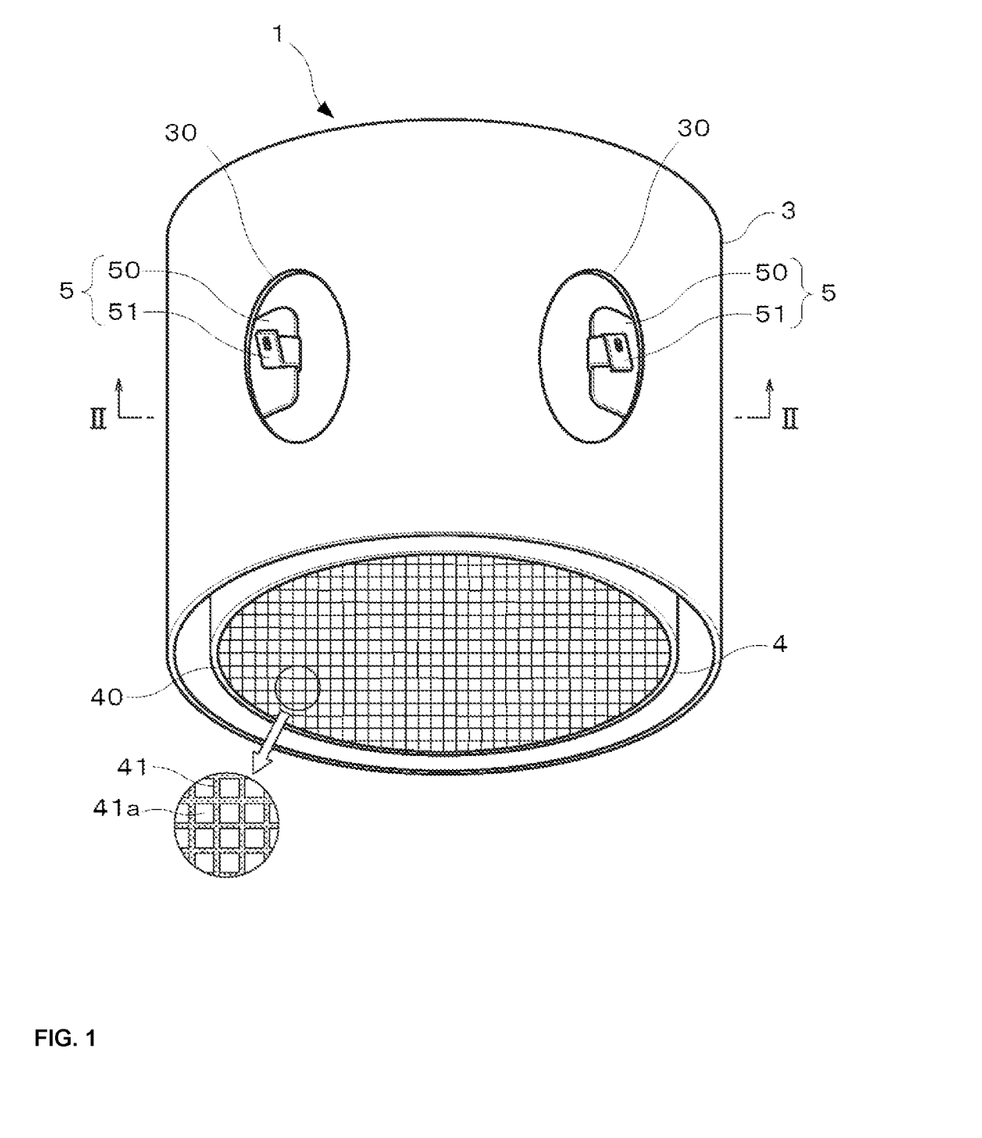
FIG. 1 is a perspective view showing an exhaust gas purification device according to Embodiment 1 of the present invention.
Figure 2:
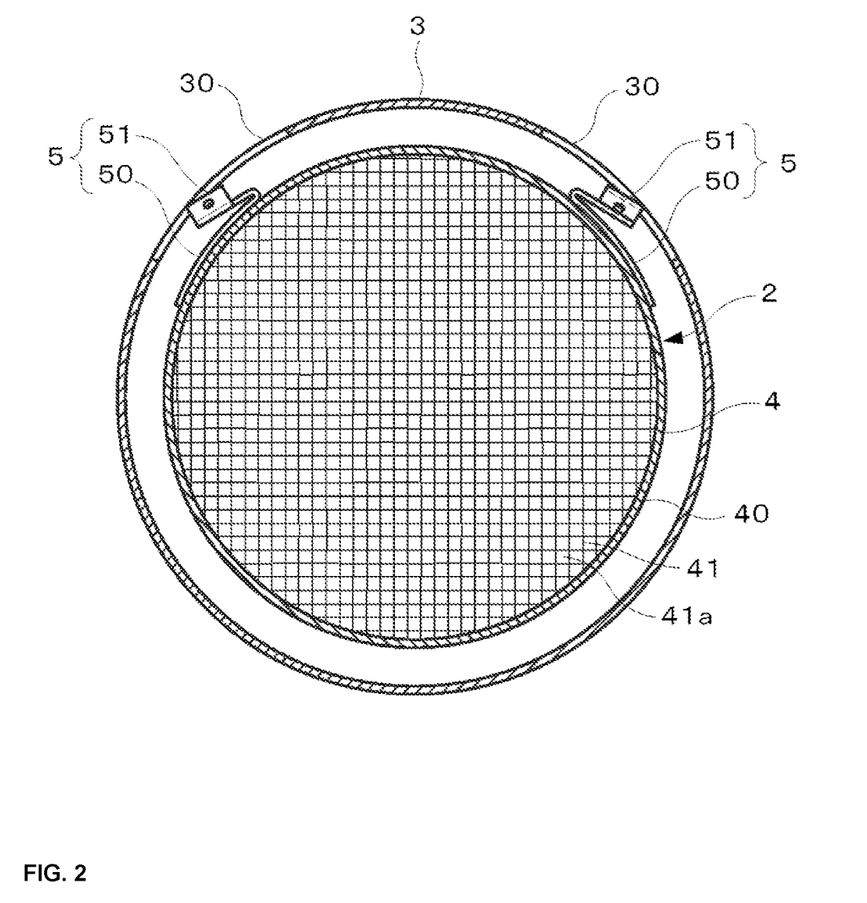
FIG. 2 is a cross-sectional view of an exhaust gas purification device taken along the line II-II in FIG. 1.

FIG. 1 is a perspective view showing an exhaust gas purification device 1 according to Embodiment 1 of the present invention, and FIG. 2 is a cross-sectional view of the exhaust gas purification device 1 taken along the line II-II in FIG. 1. The exhaust gas purification device 1 as shown in FIGS. 1 and 2 is provided, for example, on an exhaust path of a motor vehicle or the like, and is a device for purifying an exhaust gas discharged from an engine.

As shown in FIGS. 1 and 2, the exhaust gas purification device 1 has an electrically heating support 2 and a can body 3.

The electrically heating support includes: a honeycomb structure 4 and a pair of metal electrodes 5. The honeycomb structure 4 is a pillar shaped member made of ceramics, and includes: an outer peripheral wall 40; and a partition wall 41 which is arranged on an inner side of the outer peripheral wall 10 and defines a plurality of cells 41a each extending from one end face to other end face to form a flow path. The pillar shape is understandable as a three-dimensional shape having a thickness in a flow path direction of the cells 41a (an axial direction of the honeycomb structure 4). A ratio of an axial length of the honeycomb structure 4 to a diameter or width of the end face of the honeycomb structure 4 (aspect ratio) is arbitrary. The pillar shape may also include a shape in which the axial length of the honeycomb structure 4 is shorter than the diameter or width of the end face (flat shape).

An outer shape of the honeycomb structure 4 is not particularly limited as long as it has a pillar shape. For example, it can be other shapes such as a pillar shape having circular end faces (cylindrical shape), a pillar shape having oval end faces, and a pillar shape having polygonal (rectangular, pentagonal, hexagonal, heptagonal, octagonal, etc.) end faces. As for the size of the honeycomb structure 4, an area of the end faces is preferably from 2,000 to 20,000 $mm^2$, and even more preferably from 5,000 to 15,000 $mm^2$, in order to increase heat resistance (to suppress cracks generated in the circumferential direction of the outer peripheral wall).

A shape of each cell in the cross section perpendicular to the flow path direction of the cells 41a may preferably be a quadrangle, hexagon, octagon, or a combination thereof, although not limited thereto. Among these, the quadrangle and the hexagon are preferred. Such a cell shape can lead to a decreased pressure loss when an exhaust gas flows through the honeycomb structure 4, which can provide improved purification performance.

The partition wall 41 that defines the cells 41a preferably has a thickness of from 0.1 to 0.3 mm, and more preferably from 0.1 to 0.2 mm. The thickness of 0.1 mm or more of the partition wall 41 can suppress a decrease in the strength of the honeycomb structure 4. The thickness of the partition wall 41 of 0.3 mm or less can suppress a larger pressure loss when an exhaust gas flows through the honeycomb structure 4 if the honeycomb structure 4 is used as a catalyst support to support a catalyst. In the present invention, the thickness of the partition wall 41 is defined as a length of a portion passing through the partition wall 41, among line segments connecting the centers of gravity of adjacent cells 41a, in the cross section perpendicular to the flow path direction of the cells 41a.

The honeycomb structure 4 preferably has a cell density of from 40 to 150 $cells/cm^2$, and more preferably from 70 to 100 $cells/cm^2$, in the cross section perpendicular to the flow path direction of the cells 41a. The cell density in such a range can allow the purification performance of the catalyst to be increased while reducing the pressure loss when the exhaust gas flows. The cell density of 40 $cells/cm^2$ or more can allow a catalyst supported area to be sufficiently ensured. The cell density of 150 $cells/cm^2$ or less can prevent the pressure loss when the exhaust gas flows through the honeycomb structure 4 from being increased if the honeycomb structure 4 is used as a catalyst support to support the catalyst. The cell density is a value obtained by dividing the number of cells by the area of one end face portion of the honeycomb structure 4 excluding the outer peripheral wall 40 portion.

The provision of the outer peripheral wall 40 of the honeycomb structure 4 is useful from the viewpoints of ensuring the structural strength of the honeycomb structure 4 and suppressing the leakage of a fluid flowing through the cells 41a from the outer peripheral wall 40. Specifically, the thickness of the outer peripheral wall 40 is preferably 0.05 mm or more, and more preferably 0.10 mm or more, and even more preferably 0.15 mm or more. However, if the outer peripheral wall 40 is too thick, the strength will be too high, and a strength balance between the outer peripheral wall 40 and the partition wall 41 will be lost, resulting in a decrease in thermal shock resistance. Therefore, the thickness of the outer peripheral wall 40 is preferably 1.0 mm or less, and more preferably 0.7 mm or less, and even more preferably 0.5 mm or less. The thickness of the outer peripheral wall 40 is defined as a thickness of the outer peripheral wall 40 in the normal line direction relative to the tangent line at a measured point when the point of the outer peripheral wall 40 where the thickness is to be measured is observed in the cross section perpendicular to the flow path direction of the cells 41a.

The honeycomb structure 4 is made of ceramics and is preferably electrically conductive. Volume resistivity is not particularly limited as long as the honeycomb structure 4 is capable of heat generation by Joule heat when a current is applied. Preferably, the volume resistivity is from 0.1 to 200 Ωcm, and more preferably from 1 to 200 Ωcm. As used herein, the volume resistivity of the honeycomb structure 4 refers to a value measured at 25° C. by the four-terminal method.

The honeycomb structure 4 can be made of a material selected from the group consisting of oxide ceramics such as alumina, mullite, zirconia and cordierite, and non-oxide ceramics such as silicon carbide, silicon nitride and aluminum nitride, although not limited thereto. Further, silicon carbide-metal silicon composite materials and silicon carbide/graphite composite materials can also be used. Among these, it is preferable that the material of the honeycomb structure 4 contains ceramics mainly based on a silicon-silicon carbide composite material or silicon carbide, in terms of balancing heat resistance and electrical conductivity. The phrase "the material of the honeycomb structure 4 is mainly based on silicon-silicon carbide composite material" means that the honeycomb structure 4 contains 90% by mass of more of silicon-silicon carbide composite material (total mass) based on the total material. Here, the silicon-silicon carbide composite material contains silicon carbide particles as an aggregate and silicon as a binding material to bind the silicon carbide particles, preferably in which a plurality of silicon carbide particles are bound by silicon such that pores are formed between the silicon carbide particles. The phrase "the material of the honeycomb structure 4 is mainly based on silicon carbide" means that the honeycomb structure 4 contains 90% or more of silicon carbide (total mass) based on the total material.

When the honeycomb structure 4 contains the silicon-silicon carbide composite material, a ratio of the "mass of silicon as a binding material" contained in the honeycomb structure 4 to the total of the "mass of silicon carbide particles as an aggregate" contained in the honeycomb structure 4 and the "mass of silicon as a binding material" contained in the honeycomb structure 4 is preferably from 10 to 40% by mass, and more preferably from 15 to 35% by mass.

The partition wall 41 may be porous. When the partition wall 41 is porous, the porosity of the partition wall 41 is preferably from 35 to 60%, and even more preferably from 35 to 45%. The porosity is a value measured by a mercury porosimeter. Further, the partition wall 41 may be dense, and when the partition wall 41 is dense, the porosity of the partition wall 41 may be 10% or less, or 5% or less.

The partition wall 41 of the honeycomb structure 4 preferably has an average pore diameter of from 2 to 15 μm, and even more preferably from 4 to 8 µm. The average pore diameter is a value measured by a mercury porosimeter.

Although not shown, the honeycomb structure 4 is provided with electrode layers on the outer surface of the outer peripheral wall 40. The electrode layers are provided as a pair of electrode layers, for example, on the outer surface of the outer peripheral wall 40 so as to extend in the direction of the flow path of the cells 41a in a form of a band across the central axis of the honeycomb structure 4. The providing method is not limited thereto as long as it can be connected to a pair of metal electrodes 5, which will be described below. The pair of metal electrodes 5 are provided on those electrode layers, and the electrode layers and the metal electrodes 5 are connected to each other. Although not shown, the metal electrodes 5 can be connected to an external power source such as a battery via a power cable. By applying a voltage to the honeycomb structure 4 through the metal electrodes 5 and the electrode layers, the honeycomb structure 4 can generate heat.

The volume resistivity of the electrode layers is preferably $\frac{1}{200}$ or more and $\frac{1}{10}$ or less of that of the honeycomb structure 4, in terms of facilitating the flow of electricity to the electrode layers.

Each electrode layer may be made of conductive ceramics, a metal, or a composite material (cermet) of a metal and a conductive ceramic. Examples of the metal include a single metal of Cr, Fe, Co, Ni, Si or Ti, or an alloy containing at least one metal selected from the group consisting of those metals. Non-limiting examples of the conductive ceramics include silicon carbide (SiC), and metal compounds such as metal silicides such as tantalum silicide ($TaSi_2$) and chromium silicide ($CrSi_2$).

As a method for producing the honeycomb structure 4 having the electrode layers, first, an electrode layer forming raw material containing ceramic raw materials is applied onto a side surface of a honeycomb dried body and dried to form a pair of unfired electrode layers on the outer surface of the outer peripheral wall so as to extend in the form of band in the flow path direction of the cells, across the central axis of the honeycomb dried body, thereby providing a honeycomb dried body with unfired electrode layers. Then, the honeycomb dried body with unfired electrode layers is fired to produce a honeycomb fired body having a pair of electrode layers. The honeycomb structure 4 having the electrode layers is thus obtained.

The pair of metal electrodes 5 is for applying a voltage to the honeycomb structure 4. The pair of metal electrodes 5 are attached onto the outer peripheral surface of the honeycomb structure 4, more specifically, onto the electrode layers as described above. The pair of metal electrodes 5 are spaced apart from each other in the circumferential direction of the honeycomb structure 4. The pair of metal electrodes 5 may be arranged at the center of the honeycomb structure 4 in the axial direction, or may be arranged at positions displaced from the center in the axial direction. One of the pair of metal electrodes 5 is handled as a positive electrode and the other is handled as a negative electrode. That is, current flows from one metal electrode 5 through the honeycomb structure 4 to the other metal electrode 5.

Each of the pair of metal electrodes 5 has a connection portion 50 fixed to the outer peripheral surface of the honeycomb structure 4 and a drawer portion 51 extending from the connection portion 50. The connection portion 50 is in contact with and connected to the outer peripheral surface of the honeycomb structure 4. An external power source can be connected to the drawer portion 51 via a power cable (not shown). Details of the connection portion 50 and the drawer portion 51 will be described later with reference to the drawings.

By supporting a catalyst on the electrically heating support 2, the electrically heating support 2 can be used as a catalyst body. Examples of the catalyst include noble metal-based catalysts and catalysts other than those. Illustrative examples of the noble metal catalysts include three-way catalysts and oxidation catalysts having a noble metal such as platinum (Pt), palladium (Pd), and rhodium (Rh) supported on surfaces of alumina pores, and containing a co-catalyst such as ceria and zirconia; or lean NOx trap catalysts (LNT catalysts) containing an alkaline earth metal and platinum as storage components for nitrogen oxides (NOx). Examples of catalysts that do not use noble metals include NOx catalytic reduction catalysts (SCR catalysts) containing copper-substituted or iron-substituted zeolites, and the like. Further, two or more types of catalysts selected from those catalysts may be used. A method of supporting the catalyst is also not particularly limited, and it can be carried out according to the conventional method of supporting the catalyst on the honeycomb structure.

The can body 3 is a cylindrical metal member for housing the electrically heating support 2. The can body 3 has an opening 30 for drawing the drawer portion 51 to the outside. Examples of the metal include various stainless steels including chromium-based stainless steels. The inner peripheral surface of the can body 3 may also be provided with an insulating layer made of glass. The providing of the insulating layer can further enhance the effect of preventing electric leakage when the electrically heating support 2 is energized. Although not shown, a mat may be inserted between the outer peripheral surface of the honeycomb structure 4 and the inner peripheral surface of the can body 3.

Figure 3:
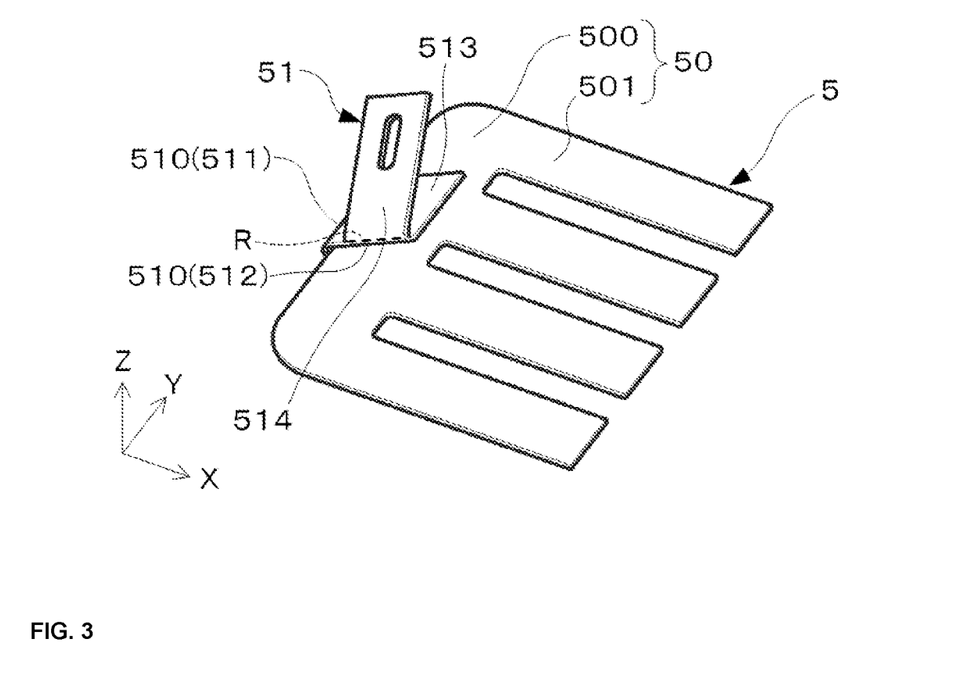
FIG. 3 is a perspective view showing a metal electrode of FIG. 2.

Next, FIG. 3 is a perspective view showing the metal electrode 5 of FIG. 2. The metal electrode 5 according to the present embodiment is composed of a single metal plate as a whole, and the connection portion 50 and the drawer portion 51 are integrally formed with each other.

The connection portion 50 has a comb-like shape as a whole. More particularly, the connection portion 50 includes: a longitudinal base portion 500; and a plurality of tooth portions 501 extending parallel to each other from one side edge of the base portion 500 while being spaced apart from each other in the longitudinal direction of the base portion 500. Each tooth portion 501 extends in a direction perpendicular to the longitudinal direction of the base portion 500.

The drawer portion 51 is formed by bending a metal piece extending from the connection portion 50. More specifically, the drawer portion 51 is formed by bending the metal piece extending from the side edge of the base portion 500 opposite to the side edge from which the tooth portions 501 extend. The metal piece forming the drawer portion 51 can extend in a direction orthogonal to the longitudinal direction of the base portion 500 from the central portion of the base portion 500 in the longitudinal direction of the base portion 500. The metal piece forming the drawer portion 51 may extend from a position shifted in the longitudinal direction of the base portion 500 from the central portion of the base portion 500 in the longitudinal direction of the base portion 500.

The drawer portion 51 is provided with at least two bent portions 510. The drawer portion 51 according to the present invention is provided with the two bent portions 510. However, the number of the bent portions 510 may be three or more. The at least two bent portions 510 are formed such that the extending directions of the respective ridgelines R are different from each other. The ridgeline R is a line along which the top of the bent portion 510 that appears on an outer side of a bent part of the bent portion 510 extends, and is also understandable as a bending line when forming the bent portion 510.

Each portion of the drawer portion 51 can rotate about an axis which is the extending direction of the ridgeline R of the bent portion 510. The drawer portion 51 can be expanded and contracted by rotating each portion. Since the extending directions of the at least two bent portions 510 are different from each other as described above, the rotation directions of the portions connected by the bent portions 510 are also different from each other. This can allow each portion to be rotated in a larger number of directions than a case where all the bending portions 510 extend in the same direction, so that the resistance of the metal electrodes 5 to vibration can be improved.

More particularly, the drawer portion 51 according to the present embodiment is provided with a first bent portion 511 and a second bent portion 512 (two bent portions 510) and a first plate portion 513 and a second plate portion 514. The first bent portion 511 is provided between the base portion 500 of the connection portion 50 and the first plate portion 513. A ridgeline R of the first bent portion 511 extends in the longitudinal direction of the base portion 500 of the connection portion 50. The second bent portion 512 is provided between the first plate portion 513 and the second plate portion 514. The second bent portion 512 is arranged on the tip side of the first plate portion 513. A ridgeline R of the second bent portion 512 extends in a direction orthogonal to the ridgeline R of the first bent portion 511. An angle at which the ridgeline R of the first bent portion 511 and the ridgeline R of the second bent portion 512 intersect with each other may be less than 90° or more than 90°. However, from the viewpoint of stress buffering (vibration absorption), the angle at which the ridgeline R of the first bent portion 511 intersects with the ridgeline R of the second bent portion 512 is preferably close to 90° (perpendicular), and the angle is more preferably 90±45°, and even more preferably 90±30°, and still more preferably 90±15°. When the ridgeline R of the first bent portion 511 and the ridgeline R of the second bent portion 512 are in a twisted relationship, the angle at which these ridgelines R intersect with each other may be understandable as an intersection angle when one of the ridgelines R intersects with the other.

For convenience of explanation, X, Y and Z axes orthogonal to one another are defined as shown in FIG. 3. It is understandable that the X axis is the axis extending in the direction in which the teeth portions 501 extend from the base portion 500 of the connection portion 50, the Y axis is the axis extending in the longitudinal direction of the base portion 500 of the connection portion 50, and the Z axis is the axis extending in the thickness direction of the base portion 500.

When the connection portion 50 is fixed to the outer peripheral surface of the honeycomb structure 4, the first plate portion 513 can rotate about the Y axis. That is, the first plate portion 513 can be displaced in the X and Z axis directions. This means that the first bent portion 511 can absorb vibrations in the X and Z axis directions. Also, the second plate portion 514 can rotate about an axis located on a plane defined by the X and Z axes. That is, the second plate portion 514 can be displaced at least in the Y axis direction. This means that the second bent portion 512 can absorb at least the vibration in the Y axis direction. That is, it is found that the drawer portion 51 according to the present embodiment can absorb vibrations in the directions of all three axes.

The extending directions of the ridgelines R of the at least two bent portions 510 can include a first direction parallel to the axial direction of the honeycomb structure 4 and a second direction orthogonal to the first direction. As shown in FIGS. 1 and 2, the metal electrode 5 is arranged so that the longitudinal direction of the base portion 500 of the connection portion 50 is parallel to the axial direction of the honeycomb structure 4, whereby the ridgeline R of the first bent portion 511 can extend in the first direction. However, another arrangement may be used, such as inclining the extending direction of the ridgeline R of the bent portion 510 by an angle of less than 90° with respect to the axial direction of the honeycomb structure 4.

The thickness of the drawer portion 51 is preferably 0.03 mm or more and 1 mm or less. The thickness of the drawer portion 51 of 0.03 mm or more can sufficiently ensure the strength of the drawer portion 51. The thickness of the drawer portion 51 of 1 mm or less can avoid the rigidity of the drawer portion 51 from being too high, lead to easy expansion and contraction of the drawer portion 51, and result in more easy absorption of vibration. The thickness of the drawer portion 51 is more preferably 0.03 mm or more and 0.8 mm or less, and further preferably 0.05 mm or more and 0.7 mm or less. The thickness of the drawer portion 51 in the above range can lead to smooth expansion and contraction of the drawer portion 51 while ensuring sufficient strength for the drawer portion 51. The thickness of the connection portion 50 may be the same as or different from the thickness of the drawer portion 51.

The metal electrode 5 may preferably be made of an alloy containing at least one selected from the group consisting of Cr, Fe, Co, Ni and Ti, and more preferably stainless steel and an Fe—Ni alloy.

In the electrically heating support 2 and the exhaust gas purification device 1 according to the present embodiment, the at least two bent portions 510 are provided in the drawer portion 51, and the extension directions of the ridgelines R of the at least two bent portions 510 are different from each other, so that the resistance of the metal electrodes 5 to vibration can be improved.

Moreover, since the thickness of the drawer portion 51 is 0.03 mm or more and 1 mm or less, the expansion and contraction of the drawer portion 51 can be smoothly performed while ensuring sufficient strength for the drawer portion 51.

Further, since the extending directions of the ridgelines R of the at least two bent portions 510 include the first direction parallel to the axial direction of the honeycomb structure 4 and the second direction perpendicular to the first direction, the electrically heating support 2 and the exhaust gas purification device 1 can more reliably improve the resistance of the metal electrodes 5 to the vibration that would be applied when they are mounted on a vehicle.

Embodiment 2

Figure 4:
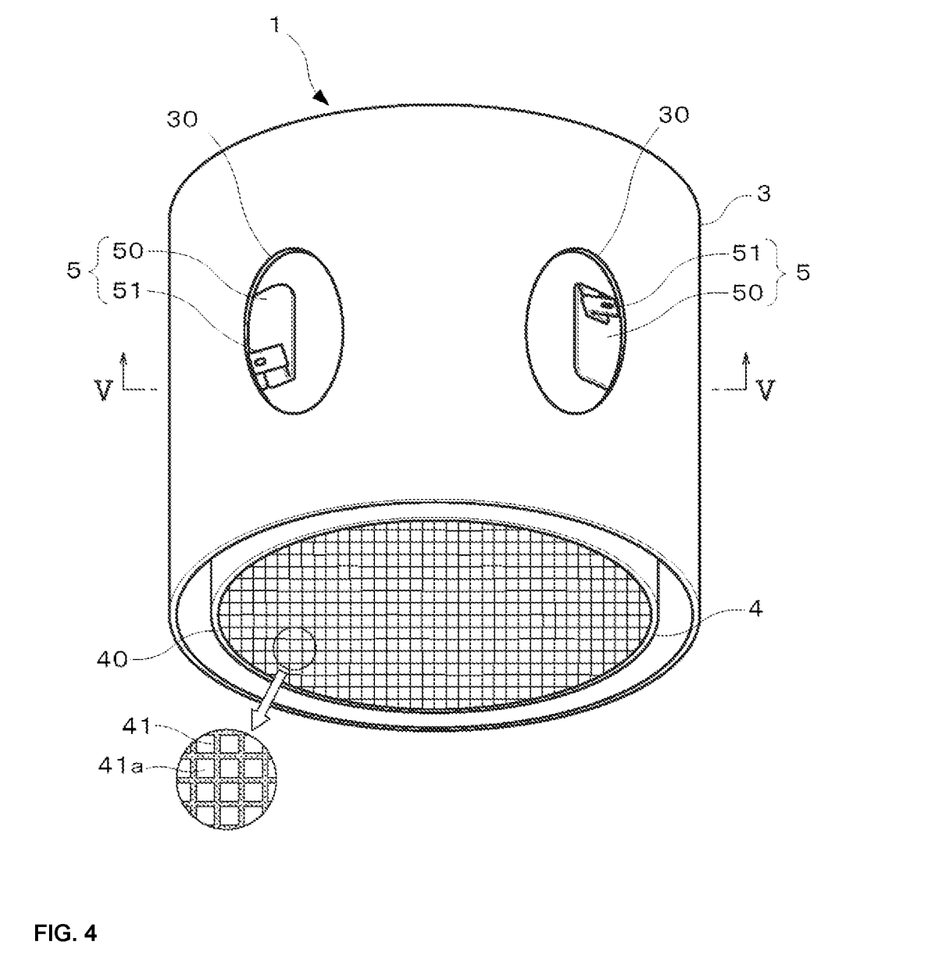
FIG. 4 is a perspective view showing an exhaust gas purification device according to Embodiment 2 of the present invention.
Figure 5:
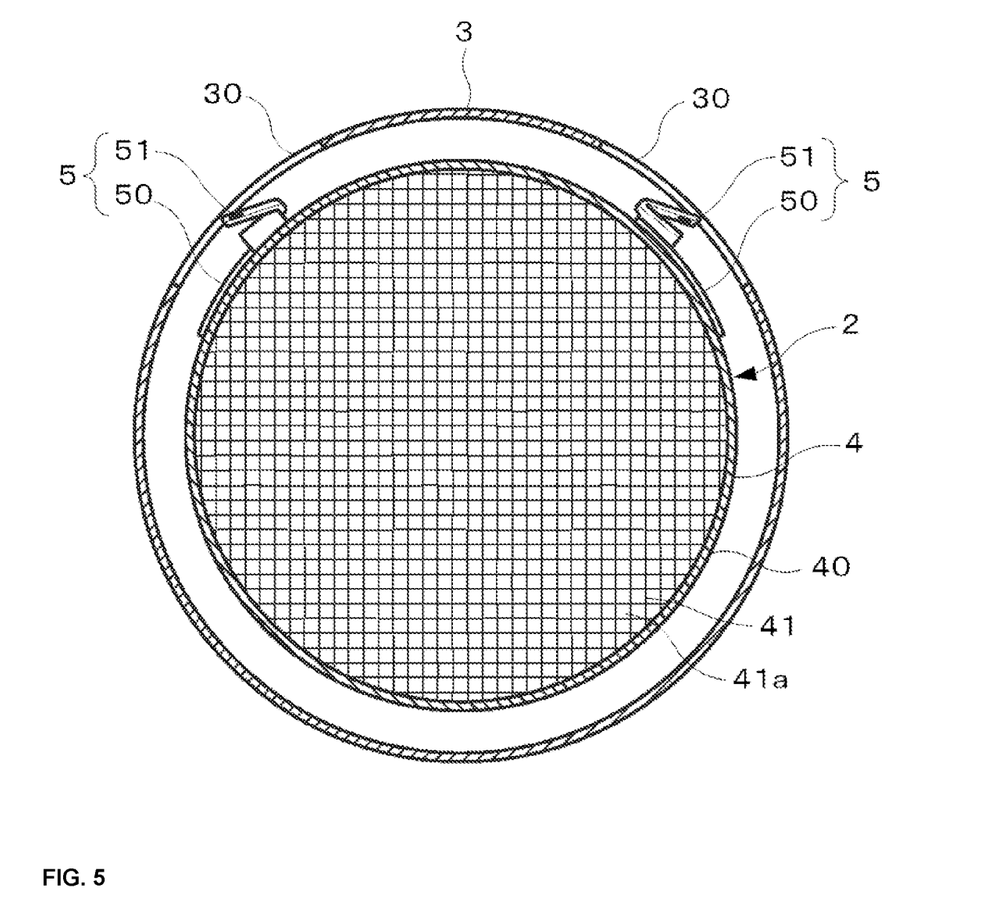
FIG. 5 is a cross-sectional view of an exhaust gas purification device taken along the line V-V in FIG. 4.
Figure 6:
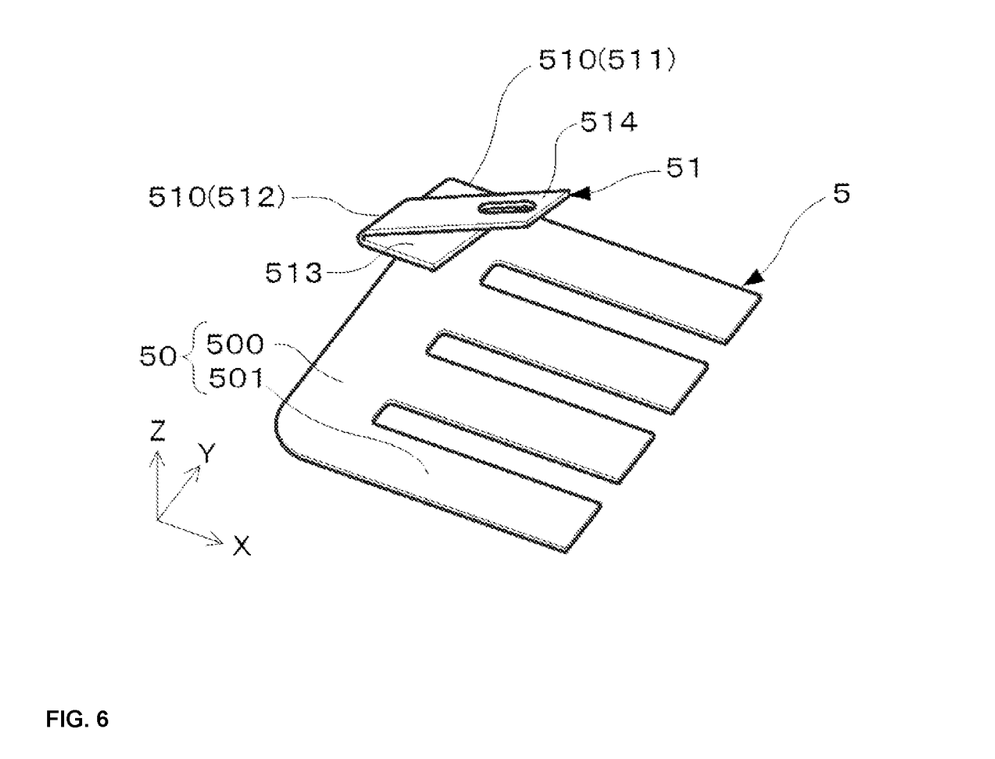
FIG. 6 is a perspective view showing a metal electrode of FIG. 5.

FIG. 4 is a perspective view showing an exhaust gas purification device 1 according to Embodiment 2 of the present invention, FIG. 5 is a cross-sectional view of the exhaust gas purification device 1 taken along the line V-V in FIG. 4, and FIG. 5 is a perspective view showing a metal electrode 5 of FIG. 5.

As shown in FIGS. 4 to 6, the drawer portion 51 of the metal electrode 5 according to Embodiment 2 is formed by bending a metal piece extending in the longitudinal direction from one end of the base portion 500 in the longitudinal direction. A ridgeline R of the first bent portion 511 of the drawer portion 51 extends in a direction orthogonal to the longitudinal direction of the base portion 500. A ridgeline R of the second bent portion 512 of the drawer portion 51 extends in the longitudinal direction of the base portion 500. That is, in Embodiment 2, the bending order of the first and second bending portions 511, 512 is reversed from that in Embodiment 1. Other structures are the same as those of Embodiment 1.

Thus, the bending order of the bent portion 510 of the drawer portion 51 may be arbitrarily changed.

Embodiment 3

Figure 7:
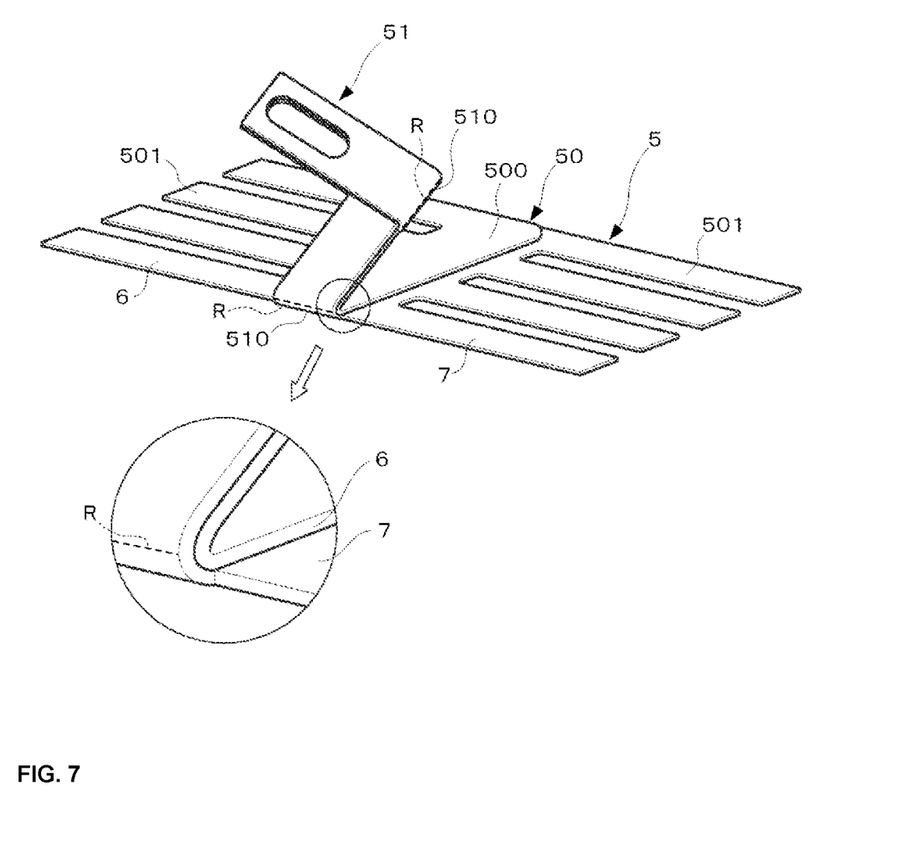
FIG. 7 is a perspective view showing a metal electrode of an exhaust gas purification device according to Embodiment 3 of the present invention.

FIG. 7 is a perspective view showing a metal electrode 5 of an exhaust gas purification device 1 according to Embodiment 3 of the present invention. As shown in FIG. 7, the metal electrode 5 may be composed of a plurality of metal plates. The metal electrode 5 according to this embodiment has a first metal plate 6 and a second metal plate 7. Each of the first and second metal plates 6, 7 has a connection portion 50 and a drawer portion 51. That is, the metal electrode 5 according to this embodiment has a plurality of connection portions 50 and a plurality of drawer portions 51.

The electrically heating support 2 according to Embodiment 3 has a pair of metal electrodes 5, as with the electrically heating support 2 according to Embodiment 1. The pair of metal electrodes 5 can be the metal electrodes 5 shown in FIG. 7. That is, the pair of metal electrodes 5 in the electrically heating support 2 according to Embodiment 3 has a plurality of connection portions 50 and a plurality of drawer portions 51, respectively.

The first and second metal plates 6, 7 are arranged such that the base portion 500 and the drawer portion 51 of each connection portion 50 overlap with each other. The tooth portions 501 of the connection portions 50 of the first and second metal plates 6, 7 extend from their respective base portions 500 in opposite directions. The structure of each of the drawer portions 51 of the first and second metal plates 6, 7 is the same as that of Embodiment 2. However, the bending angles of the bent portions 510 are appropriately adjusted so that the drawer portions 51 of the first and second metal plates 6, 7 are entirely in surface contact with each other. Other structures are the same as those of Embodiments 1 and 2.

Embodiment 4

Figure 8:
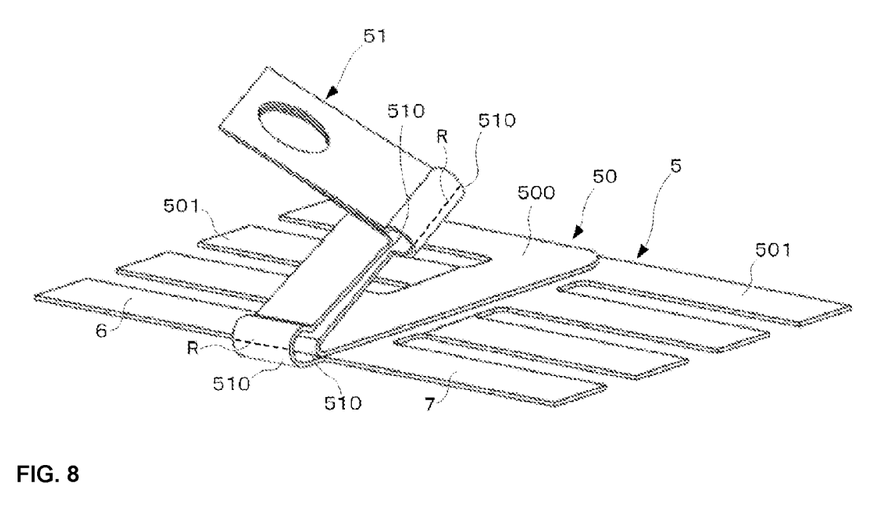
FIG. 8 is a perspective view showing a metal electrode of an exhaust gas purification device according to Embodiment 4 of the present invention.

FIG. 8 is a perspective view showing a metal electrode 5 of an exhaust gas purification device 1 according to Embodiment 4 of the present invention. Although Embodiment 4 (FIG. 7) discloses that the drawer portions 51 of the first and second metal plates 6, 7 are entirely in surface contact with each other. 51 may not be in contact with each other, the drawer portions 51 of the first and second metal plates 6, 7 may not be in contact with each other. Vibration can be absorbed even if these drawer portions 51 are not in surface contact. In the embodiment shown in FIG. 8, curvature radii of the bent portions 510 are different from each other so that the bent portion 510 positioned on the outer side of the bent part and the bent portion 510 positioned on the inner side of the bent part are not in contact with each other. Other structures are the same as those of Embodiments 1 to 3.

Examples

The present inventors prepared a plurality of stainless steel metal electrodes 5 each having a plurality of teeth portions 501 as shown in FIG. 3, and conducted a vibration test. As shown in the table below, the plurality of metal electrodes 5 are made different from each other in the form of the bent portion 510 in the drawer portion 51 and the thickness of the drawer portion 51. In the table below, a metal electrode 5 having two bent portions 510 in which the extending directions of the ridgelines R of the two bent portions 510 are the same as each other is shown as a comparative example, and a metal electrode 5 having two different bend portions 510 in which the extending directions of the ridgelines R are different from each other is shown as an example. The comparative example is a metal electrode 5 having a bellows-shaped drawer portion 51 (the extending directions of the ridgelines R of the two bent portions 510 are the same) obtained by simply folding a long metal piece twice.

In the vibration test, the tip portion of each tooth portion 501 (the portion spaced apart from the base portion 500) was joined to a ceramic test piece sample, and a terminal for external connection was fastened to the tip of the drawer portion 51 with a nut. Also, the single vibration in the X axis direction and the single vibration in the Y axis direction shown in FIG. 3 were individually applied to a work piece (the test piece sample and the metal electrode 5). The vibration frequency was 150 Hz, the vibration acceleration was 40 G, and the time applied for the simple vibration was 2 hours. Also, ten metal electrodes 5 were used for simple vibration in each axial direction. Then, it was investigated whether or not the joint portion between the tip portion of each tooth portion 501 and the test piece sample, and the bent portion 510 were broken. The breakage of the joint portion includes peeling of the tip portion of each tooth portion 501 and the test piece sample. The results are shown in the table below.

TABLE 1

| | | | Extending | | Vibration in X Axis Direction | | Vibration in Y Axis Direction | | |
|---|---|---|---|---|---|---|---|---|---|
| | | Number of Bent Portions in Drawer Portion | Direction of Ridgeline of Bent Portion | Thickness of Drawer Portion (mm) | Number of Bent Portions Broken | Number of Joint Portions Broken | Number of Bent Portions Broken | Number of Joint Portions Broken | Total Number of Broken Samples |
| Comparative Examples | 1 | 2 | Same | 0.03 | 9/10 | 0/10 | 0/10 | 8/10 | 17 |
| | 2 | | | 0.05 | 2/10 | 0/10 | 0/10 | 10/10 | 12 |
| | 3 | | | 0.1 | 0/10 | 0/10 | 0/10 | 10/10 | 10 |
| | 4 | | | 0.5 | 0/10 | 0/10 | 0/10 | 10/10 | 10 |
| | 5 | | | 0.7 | 0/10 | 1/10 | 0/10 | 10/10 | 11 |
| | 6 | | | 0.8 | 0/10 | 8/10 | 0/10 | 10/10 | 18 |
| Examples | 1 | 2 | Different | 0.03 | 5/10 | 0/10 | 5/10 | 0/10 | 10 |
| | 2 | | | 0.05 | 1/10 | 0/10 | 2/10 | 0/10 | 3 |
| | 3 | | | 0.1 | 0/10 | 0/10 | 0/10 | 0/10 | 0 |
| | 4 | | | 0.5 | 0/10 | 0/10 | 0/10 | 0/10 | 0 |

TABLE 1-continued

| Number of Bent Portions in Drawer Portion | Extending Direction of Ridgeline of Bent Portion | Thickness of Drawer Portion (mm) | Vibration in X Axis Direction | | Vibration in Y Axis Direction | | Total Number of Broken Samples |
|---|---|---|---|---|---|---|---|
| | | | Number of Bent Portions Broken | Number of Joint Portions Broken | Number of Bent Portions Broken | Number of Joint Portions Broken | |
| 5 | | 0.7 | 0/10 | 1/10 | 0/10 | 0/10 | 1 |
| 6 | | 0.8 | 0/10 | 6/10 | 0/10 | 5/10 | 11 |

For example, as can be seen from the comparison of the total numbers of broken samples in Comparative Examples and Examples having the same thickness of the drawer portions 51 such as Comparative Example 1 and Example 1, the metal electrodes 5 in which the extending directions of the ridgelines R are different from each other are difficult to be broken as compared to the metal electrodes 5 in which the extending directions of the ridgelines R are the same. Particularly, in Examples, it is found that the breakage of the joint portion is suppressed when the vibration is applied in the Y axis direction. This would be because the metal electrodes 5 according to Examples can absorb the vibration in the Y axis direction by providing the second bent portion 512. It is, therefore, understandable that the superiority of providing the drawer portion 51 with the at least two bent portions 510 in which the extension directions of the ridgelines R of the bent portions are different from each other.

It is found from the comparison of Comparative Examples 1-6 with Examples 1-6 that the number of breakages is suppressed when at least the thickness of the drawer portion 51 is 0.03 mm or more and 0.8 mm or less.

DESCRIPTION OF REFERENCE NUMERALS

1: exhaust gas purification device
2: electrically heating support
3: can body
30: opening
4: honeycomb structure
40: outer peripheral wall
41: partition wall
41a: cell
5: metal electrode
50: connection portion
51: drawer portion
510: bent portion
R: ridgeline

The invention claimed is:

1. An electrically heating support, comprising:
a ceramic honeycomb structure, the honeycomb structure comprising an outer peripheral wall and a partition wall arranged on an inner side of the outer peripheral wall, the partition wall defining a plurality of cells each extending from one end face to the other end face to form a flow path; and
a pair of metal electrodes for applying a voltage to the honeycomb structure,
wherein each metal electrode of the pair of metal electrodes comprises:
at least one connection portion fixed to an outer peripheral surface of the honeycomb structure;
at least one drawer portion extending from the at least one connection portion, and
wherein the at least one drawer portion is provided with at least two bent portions, and extending directions of ridgelines of the at least two bent portions are different from each other and include a first direction parallel to an axial direction of the honeycomb structure and a second direction orthogonal to the first direction.

2. The electrically heating support according to claim 1, wherein the drawer portion has a thickness of 0.03 mm or more and 1 mm or less.

3. The electrically heating support according to claim 1, wherein each metal electrode of the pair of metal electrodes has a plurality of the connection portions and a plurality of the drawer portions each extending from the plurality of connection portions.

4. The electrically heating support according to claim 1, wherein the honeycomb structure has a pair of electrode layers provided on an outer surface of the outer peripheral wall across a central axis of the honeycomb structure so as to each extend in a form of a band in a flow path direction of the cells, and
wherein the pair of metal electrodes are connected to the electrode layers.

5. An exhaust gas purification device, comprising:
the electrically heating support according to claim 1; and
a metal can body housing the electrically heating support, the can body having an opening for drawing the drawer portion to the outside.

* * * * *